March 27, 1951     O. Z. LEE     2,546,459
AUTOMOBILE TRAY FOR INSTRUMENT PANELS
Filed Feb. 17, 1950     3 Sheets—Sheet 1
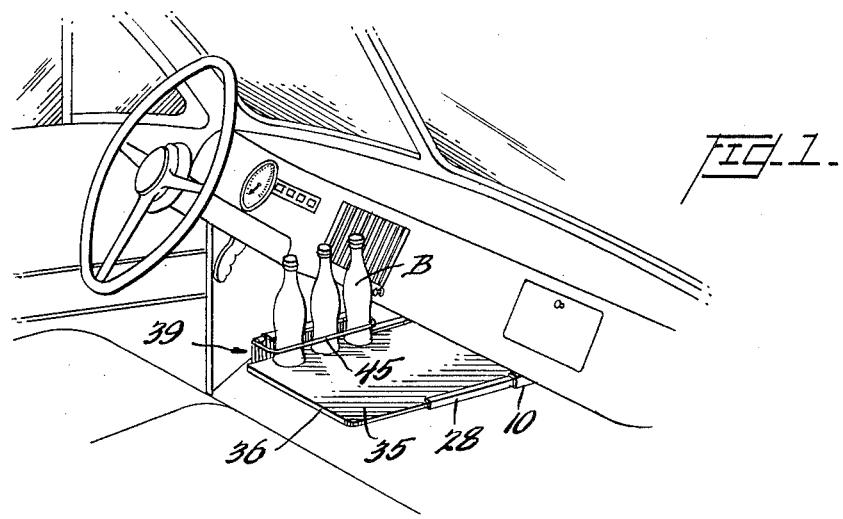
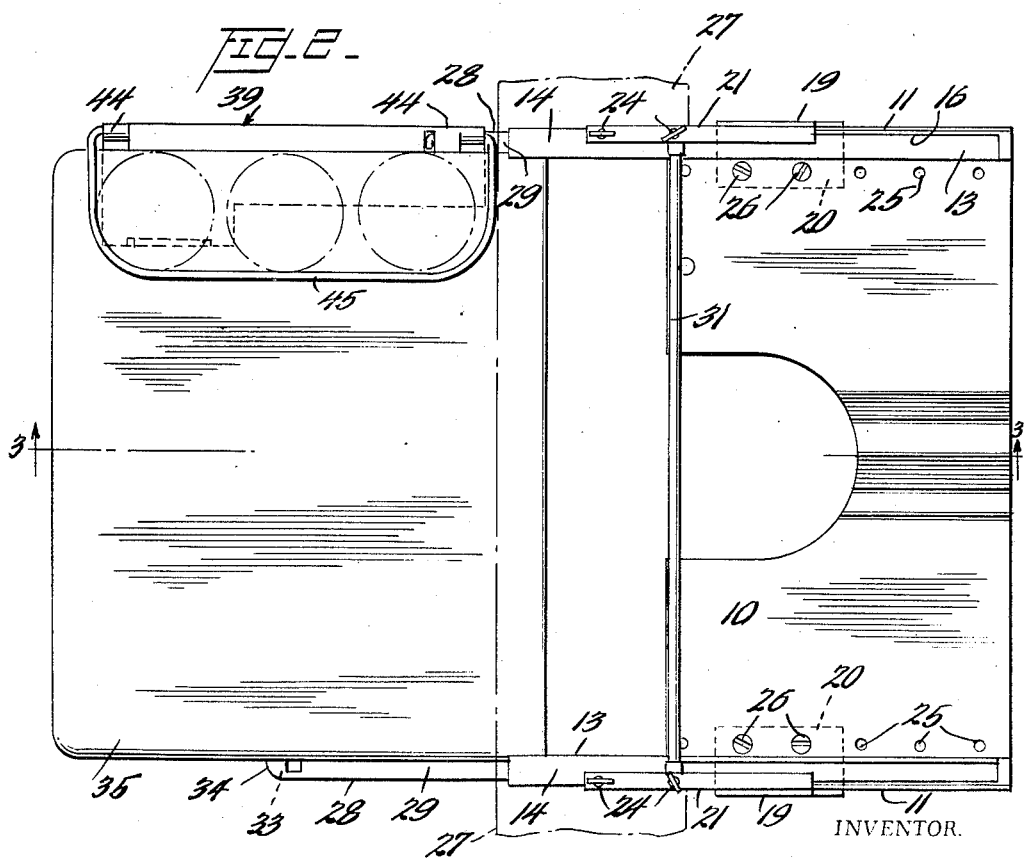
INVENTOR.
O. Z. Lee
BY
Low & Low
ATTORNEYS

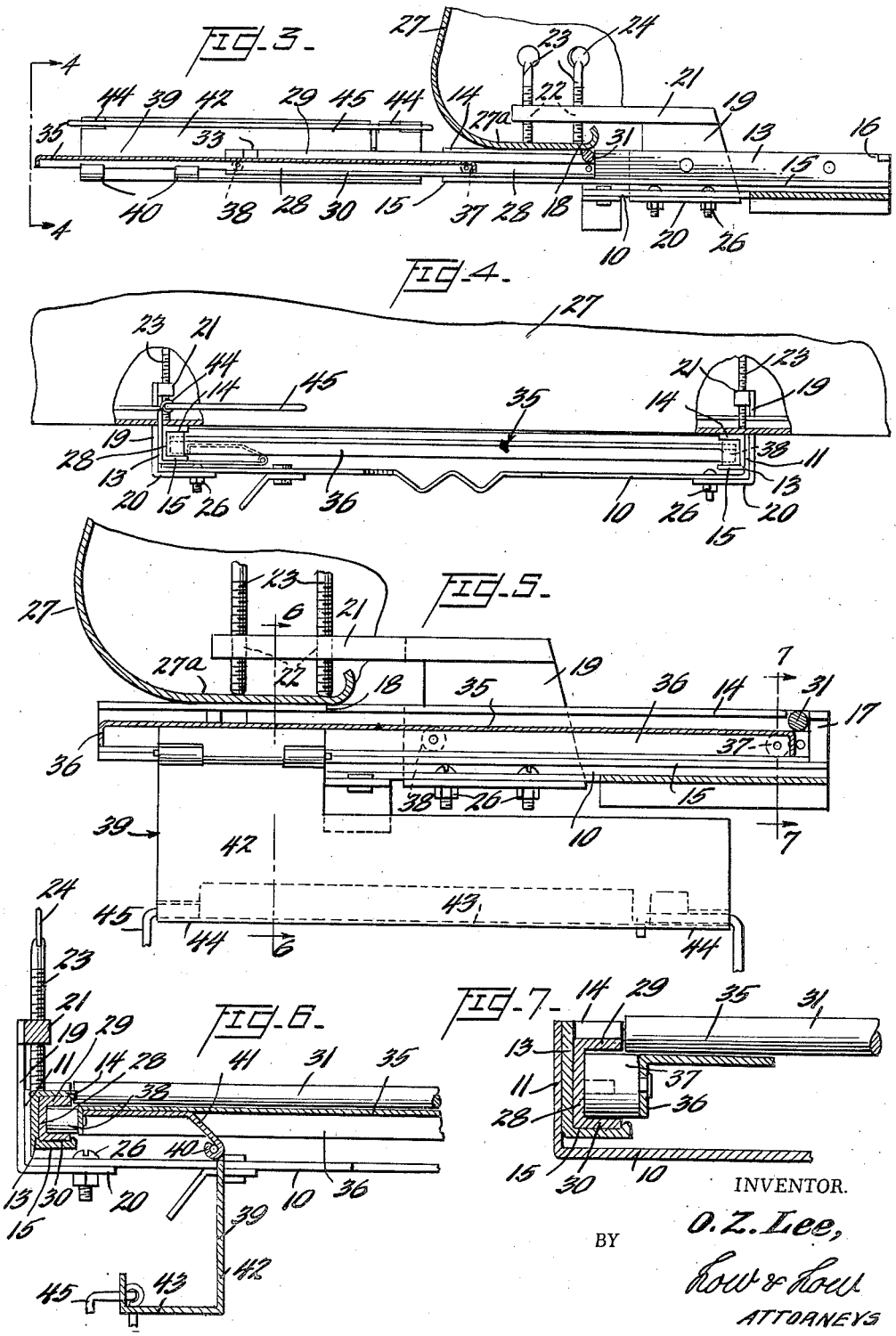

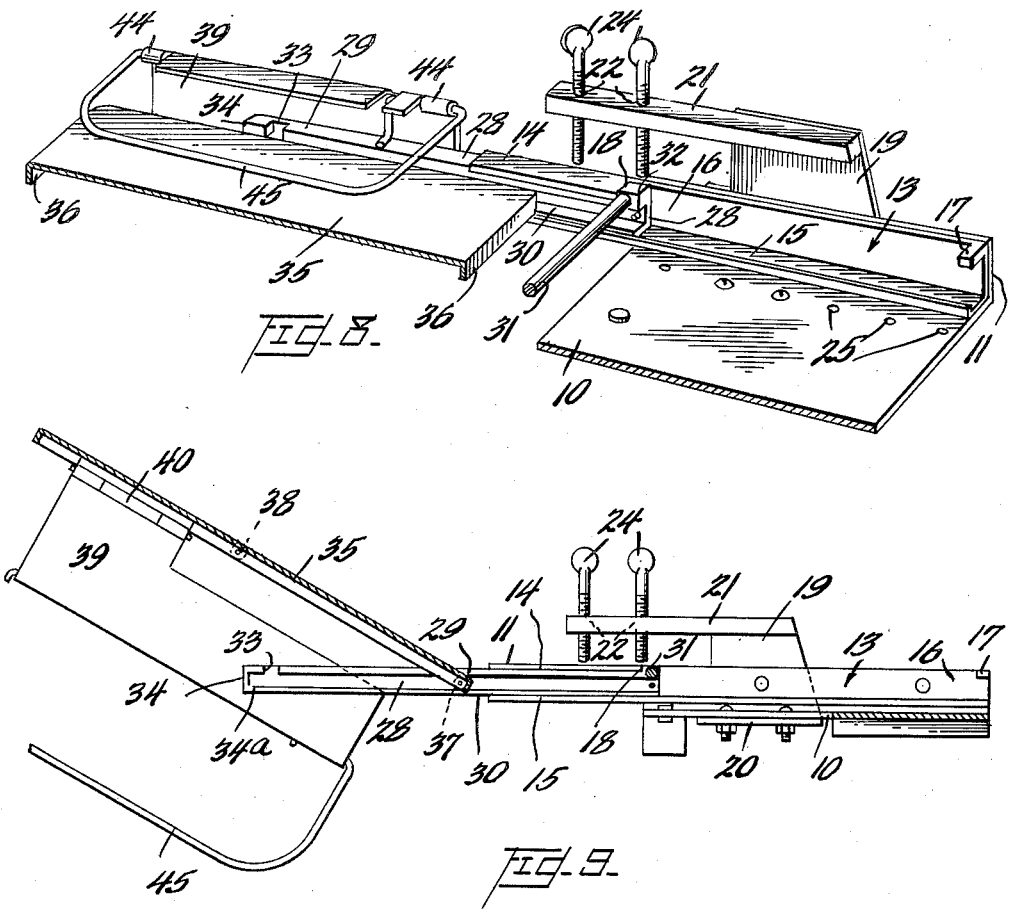

Patented Mar. 27, 1951

2,546,459

UNITED STATES PATENT OFFICE 2,546,459

AUTOMOBILE TRAY FOR INSTRUMENT PANELS

O. Z. Lee, Frederick, Okla.

Application February 17, 1950, Serial No. 144,726

6 Claims. (Cl. 311—21)

The invention relates to automobile trays, shelves or tables and has for its objects to provide certain new and useful improvements in devices of this character.

An important object of the invention is to provide an automobile tray or the like of a portable character wherein provision is made for removably securing the tray or shelf assembly to the instrument panel of various automobiles of standard construction without necessitating drilling or marring of the instrument panel to which the device is or may be temporarily secured.

A further object is to provide an automobile shelf or tray assembly which may be removably secured to the instrument panel of cars of various makes, wherein diverse configurations and curvatures are present in the instrument panel. In this respect provision is made for adjusting the shelf supporting means to compensate for different degrees of angularity or curvature in the instrument panel so that the shelf or tray may be withdrawn from and retracted into beneath the instrument panel in a direction substantially parallel or coincident with the longitudinal car axis. This feature compensates for the varied styling of the instrument panel in various types of automobiles.

A further object is to provide in the tray assembly a collapsible bottle rack which may be moved into position when desired to retain bottles against being inadvertently knocked from their tray supported position. Said bottle rack when in operative position constitutes effective means for preventing the tray from being inadvertently telescoped into or towards its normally concealed position beneath the instrument panel while the tray or shelf is being used. When not desired to be used, the bottle rack is supported by the tray in a depending position where it is out of the way so as not to interfere with the use of the tray as a luncheon table or as a small desk for writing purposes, or when the tray is telescoped inwardly to its normally concealed position.

A further object is to provide a telescoping or collapsible tray unit, means for yieldably holding the tray in its extended or retracted position, thereby insuring against the tray sliding from either of such adjusted positions due to vibration of the car.

A further object is to provide a collapsible or telescoping automobile tray unit or assembly which is of sturdy construction, economical in manufacture, and wherein the tray member or shelf per se may be easily removed for cleaning purposes or for substitution of other tray members to match the color of a particular car or automobile. This is effected without necessitating removal or detachment of the tray support from the automobile instrument panel.

Numerous other objects and advantages of the invention will become apparent as it is better understood from the following description, which taken in conjunction with the accompanying drawings, discloses a preferred embodiment thereof.

In said drawings:

Fig. 1 is a perspective view of the serving tray or shelf in extended operative position relative to the automobile instrument panel on which the device is removably mounted.

Fig. 2 is an enlarged plan view of the tray in its extended or operative position as viewed in Fig. 1.

Fig. 3 is a sectional view of the extended tray taken on the line 3—3 of Fig. 2.

Fig. 4 is a front elevation of the tray as viewed from the left in Figs. 2 and 3, parts being broken away and shown in section to more clearly illustrate its manner of attachment to the automobile instrument panel.

Fig. 5 is a view similar to Fig. 3 but on an enlarged scale and showing the tray in its retracted or concealed position.

Fig. 6 is a sectional view on line 6—6 of Fig. 5.

Fig. 7 is a sectional detail on line 7—7 of Fig. 5.

Fig. 8 is a perspective view partially in section, of the tray assembly when in extended position.

Fig. 9 is a side elevation of the assembly shown in Fig. 8, but illustrating how the serving tray element per se is assembled in operative position on its telescoping support, or removed therefrom.

Referring to the drawings, 10 indicates a base plate or member of U or channel shape and of substantially rectangular configuration, having upstanding flange or wall portions 11 at opposite sides thereof. Fixedly secured to the inner surface of each side wall 11, as by rivets 12 or by welding, and projecting forwardly therefrom at opposite sides of said base member 10, is a channel member 13 having inwardly projecting upper and lower flange or wall portions 14 and 15. The upper inwardly projecting flange 14 is cut away at its rear end as indicated at 16 so as to provide a rear abutment 17 and a forward abutment 18 on the said flange of each channel member 13. The space between said flanges of the opposed channel members 13 constitutes a slideway or channel in the fixed portion of the tray assembly.

Opposed bracket members 19 are provided and are independently and adjustably secured to opposite sides of the base member 10. Each bracket member includes a lower horizontal flange portion 20 extending beneath the base member wall and an upper inwardly and forwardly extending elongated flange or lug arm 21 provided with spaced apertures 22 for the reception of a pair of threaded screw elements 23 having enlarged manipulatable heads 24. The base member or plate 10 is provided at its opposite sides with a series of spaced apertures 25 disposed immediately inwardly of the fixed channel members 13, and the inwardly extending flange 20 of each bracket member is also provided with correspondingly spaced apertures for the reception of bolts or screws 26 for the purpose of adjustably mounting the brackets rigidly upon and relative to the longitudinal extent of the base member side walls 11, and in any desired relative position.

From the described construction and as best seen in Fig. 3, it will be apparent that the base member 10 and its described associated parts may be removably attached to beneath the curved instrument panel 27 of an automobile by means of the said elements 23 threadedly engaging the bracket member lug arms 21 at each side of the base plate 10. Said arms it will be observed, project forwardly over the lower wall 27a of the instrument panel (Fig. 5). The screws 23 are threaded inwardly relative to the arms 19 so as to rigidly mount the described tray support in position. The longitudinal or angular position of the base member relative to the panel 27 is determined by the adjusted relative position of the bracket members 19 on the base member 10 by virtue of the screw elements 26 engaging the spaced apertures 25 in the base plate 10.

The relatively adjustable portion of the tray assembly comprises a pair of channel members 28 slidably mounted within the fixed channel members 13 at opposite sides of the base support, each slidable channel member having inwardly extending upper and lower flanges or wall portions 29 and 30. The opposed slidable channel members 28 are connected together at their rear ends by a tie rod 31 to provide unitary slidable movement for these elements within the confines or slideways of the fixed channel elements 13. Opposite ends of the tie rod are suitably secured within upstanding integral lug elements 32 (Fig. 8) on the upper channel walls 29 of the slidable channel members 28. In this manner inward or rearward sliding movement of the movable channel members 28 is limited by engagement of the lugs 32 with the inwardly projecting lugs 17 of the fixed channel members 13. Forward movement of the slidable channel elements 28 is limited by engagement of their said lugs 32 with the aforesaid abutments 18 on the upper flange 14 of the fixed channel members 13.

The upper walls 29 of the slidable channel members 28 are cut away adjacent their forward ends as indicated at 33, and said members have a closed wall portion 34 (Fig. 9) at their forward extremities. Adjacent the closed wall 34 the side channel of each member 28 is slightly indented or depressed at 34a for a purpose to be described.

The food or snack supporting tray proper of the device comprises a slidable and removable panel element 35 having a depending peripheral wall or flange skirt 36, and is preferably constructed of stainless steel, aluminum, plastic, or any desirable and appropriate material.

A pair of anti-friction rollers 37 are suitably journaled on the flange wall 36 at the rear of the tray and on opposite sides thereof, and a similar pair of opposed anti-friction rollers 38 is mounted on said flange wall at a locality intermediate their longitudinal extent on opposite sides of the tray. The provision of said anti-friction rollers permits the tray to slide easily within and relative to the movable channel elements 28, both during assembly and use of the device.

The tray 35 preferably includes movable means for holding bottles B and the like when the tray is in its outwardly extended operative position. To this end a bracket member 39 of generally L shape is hingedly mounted at its inner end as at 40 to a fixed lug 41 on the under surface of the tray. Said hingedly mounted bracket member includes an upstanding wall portion 42 terminating in an inwardly projecting flange 43 when the device is swung upwardly into operative position as viewed in Figs. 1 to 4. The said flange 43 is desirably curled at its opposite ends to constitute longitudinally aligned bearings 44 for the reception of opposed inwardly turned ends of a metal or spring wire bail member 45 of generally U-shaped configuration, thereby constituting a hinged or pivotal mounting for the bail relative to the hingedly mounted L-shaped bracket member 39.

When it is desired to hold and support bottles B against displacement upon the tray 35, the bracket member 39 is swung upwardly and the bail 45 hinged inwardly into the position shown in Figs. 1 to 4. In this position the bottles are effectively maintained against shifting on the tray, and the bail 45 being thus elevated above the instrument panel, also constitutes an abutment or stop which by contact with the instrument panel, serves to prevent the tray from being inadvertently shifted inwardly from its extended operative position. When no bottles are present or when the tray is being used as a desk or shelf, the bracket member 39 may be swung downwardly on its hinge pintle support 40 so as to depend in an out of the way position as shown in Figs. 5 and 6. In this position the bracket member 39 and bail do not interfere with the telescoping movement of the tray relative to the fixed portion of the assembly, into and out of extended position.

In the event angularity or curvature in a horizontal plane is present in the automobile instrument panel at the locality where it is desired to install the tray, it will be apparent that the opposed bracket members 19 may be adjusted accordingly and relative to one another on opposite sides of the base plate 10, by virtue of their attaching members 26 and opposed spaced apertures 25 in the plate. The described telescoping tray unit, preferably while in collapsed condition, is clamped in place to the under surface 27a of the instrument panel 27 by manually or otherwise turning down the screw elements 23 on opposite sides of the unit into the position shown in Fig. 5, wherein the tray element 35 of the assembly is shown in concealed or retracted inoperative position. In this position it will be noted the forward flange 36 of the tray is disposed beneath or substantially flush with the instrument panel so that no interference with normal car operation is encountered thereby. The tray may be extended for use by grasping flange 36 and pulling the tray outwardly. This results in the anti-friction tray rollers 37 and 38 moving easily within the opposite runways of the movable channel members 28 until the forward rollers 38 contact the closed forward ends of said channel members. Continued outward pull on the tray results in the said channel members 28 sliding outwardly within and relative to the fixed channel members 13 until the rear lug members 32 of the channels strike against the forward abutments 18 on the fixed channel member walls 14, as best seen in Figs. 3 and 8. The tray is then in completely extended position and sufficiently clear of the instrument panel to permit the bottle rack assembly 39, 45 to be swung upwardly and inwardly into operative position as shown in said figures. When thus positioned the rear end of the bottle retailing bail is closely adjacent the instrument panel to prevent the tray from telescoping inwardly as will be apparent.

The tray is inwardly telescoped into retracted concealed position by a pushing movement on the tray which first serves to retract the tray 35 on its anti-friction rollers and relative to the movable channel members 28, and thereafter serves to slide said channel members and tray inwardly relative to the fixed channel members 13, into fully concealed position as shown in Fig. 5.

The tie rod 31 insures concerted movement of the movable channels 38 as a unit during both tray extending and retracting operations on the assembly.

When the tray is in extended position its forward anti-friction rollers 38 rest within the depressions 34a at the forward ends of the channel members 28, thereby serving to prevent the tray from moving rearwardly due to car vibration, or until the tray is positively pushed rearwardly relative to the channel members to disengage said rollers from the said depressions.

The tray element 35 proper may be easily removed for cleaning, or for replacement by another tray, by moving its forward anti-friction rollers 38 into registry with the cut-away portions 33, at the forward ends of the movable channel members 28. The tray may be thus lifted out of engagement with the channel members, and its rear rollers 37 in turn moved forward into registry with said cut-away portions, thereby permitting the entire tray to be lifted from the channel members. The tray may be replaced by a reverse operation and this manner of replacement and removal is substantially shown in Fig. 9 of the drawings.

It will be obvious that to remove the entire assembly from the automobile instrument panel it is merely necessary to loosen the screws 23 sufficiently to permit the lower ends of the same to clear the outwardly turned rear edge of the instrument panel wall 27a (Fig. 5). The overhanging forward ends of the lug members 21 may then be cleared from the instrument panel and the assembly stored or transferred to another automobile if desired.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

What I claim is:

1. An automobile tray unit comprising a base plate having means for attachment to the instrument panel of the car, a pair of opposed channel members fixed on opposite sides of said plate and a pair of opposed connected channel members movably housed within said fixed channel members, a tray member mounted at its opposite sides within said movable channel members for sliding movement relative thereto, and a bottle rack hingedly secured to and depending from said tray member, whereby said tray and said movable channel members are independently and conjointly movable to superpose said tray over said base plate in retracted position beneath the car instrument panel or to project the tray outwardly from said plate in extended operative position, said bottle rack being hingedly movable into upright position when the tray is extended to constitute a stop element to prevent the tray from being moved towards its retracted position beneath said instrument panel.

2. An automobile tray unit comprising a base plate having a pair of opposed channel members fixed on opposite sides thereof and a pair of opposed connected channel members movably housed within said fixed channel members, a plurality of spaced aligned apertures on opposite sides of said plate and a pair of oppositely disposed bracket members selectively engageable with said apertures to secure the bracket members to opposite sides of the plate in a variety of relatively adjustable positions to compensate for varying angularity and curvatures of different car instrument panels, said bracket members having means thereon for securing the plate to a said instrument panel, and a tray member mounted at is opposite sides within said movable channel members for movement relative thereto, whereby said tray and said movable channel members are independently and conjointly movable to superpose said tray over said base plate in retracted position beneath the car instrument panel or to project the tray outwardly from said plate in extended operative position.

3. An automobile tray unit comprising a base plate having opposed bracket members secured to opposite sides thereof, said bracket members having forwardly projecting overhanging arms having securing means thereon for attachment of the plate to the instrument panel of an automobile, a pair of opposed channel members fixed on opposite sides of said plate and a pair of opposed connected channel members movably housed within said fixed channel members, and a tray member having anti-friction rollers mounted on its opposite sides and disposed within said movable channel members for movement relative thereto, whereby said tray and said movable channel members are independently and conjointly rollable and slidable within and relative to said fixed channel members to superpose said tray over said base plate in retracted position beneath the car instrument panel or to project the tray outwardly from said plate in extended operative position.

4. An automobile tray unit comprising a base plate having opposed bracket members secured to opposite sides thereof, said bracket members having forwardly projecting overhanging arms having securing means thereon for attachment of the plate to the instrument panel of an automobile, a pair of opposed channel members having spaced upper and lower walls fixed on opposite sides of said plate, the upper wall of each channel member being cut away to provide front and rear abutments, a pair of opposed connected grooved channel members slidably housed within said fixed channel members, each of said slidable channel members having a lug member thereon engageable with said front and rear abutments on said fixed channel members to limit sliding movement of said slidable channel members therein in opposite directions, and a tray member having anti-friction rollers mounted on its opposite sides and disposed within the grooves of said slidable channel members for movement relative thereto, whereby said tray and said slidable channel members are independently conjointly rollable and slidable within and relative to said fixed channel members to superpose said tray over said base plate in retracted position beneath the car instrument panel or to project the tray outwardly from said plate in extended operative position.

5. An automobile tray unit comprising a base plate having opposed bracket members secured to opposite sides thereof, said bracket members having forwardly projecting overhanging arms having securing means thereon for attachment of the plate to the instrument panel of an automobile, a pair of opposed channel members having spaced upper and lower walls fixed on opposite sides of said plate, the upper wall of each channel member being cut away to provide front and rear abutments, a pair of opposed connected grooved channel members slidably housed within said fixed channel members, each of said slidable channel members including an upper flange wall having a lug member thereon engageable with said front and rear abutments on said fixed channel members to limit sliding movement of said slidable channel members therein in opposite directions, said upper flange wall of each slidable channel member being cut away adjacent its forward end, and a tray member having anti-friction rollers mounted on its opposite sides and disposed within the grooves of said slidable channel members for movement relative thereto, said tray member rollers being insertable into said cut away portions of said slidable channel member flange walls to assemble and displace the tray relative to said slidable channel members, whereby said tray and said slidable channel members are independently conjointly rollable and slidable within and relative to said fixed channel members to superpose said tray over said base plate in retracted position beneath the car instrument panel or to project the tray outwardly from said plate in extended operative position.

6. An automobile tray unit comprising a base plate having opposed bracket members secured to opposite sides thereof, for attachment of the plate to the instrument panel of an automobile, a pair of opposed channel members having spaced upper and lower walls fixed on opposite sides of said plate, the upper wall of each channel member being cut away to provide front and rear abutments, a pair of opposed connected channel members having grooves therein closed at their forward ends slidably housed within said fixed channel members, each of said slidable channel members having a lug member thereon engageable with said front and rear abutments on said fixed channel members to limit sliding movement of said slidable channel members therein in opposite directions, and a tray member having anti-friction rollers mounted on its opposite sides and disposed within the grooves of said slidable channel members for movement relative thereto, said channel member grooves having depressions adjacent their forward ends for the reception of the tray member rollers to hold the tray in extended position against displacement due to vibration of the automobile, whereby said tray and said slidable channel members are independently conjointly rollable and slidable within and relative to said fixed channel members to superpose said tray over said base plate in retracted position beneath the car instrument panel or to project the tray outwardly from said plate in extended operative position.

O. Z. LEE.

REFERENCES CITED

The following references are of record in the file of this patent:

UNITED STATES PATENTS

| Number | Name | Date |
|---|---|---|
| 884,525 | Ripson et al. | Apr. 4, 1908 |
| 946,151 | Patterson | Jan. 11, 1910 |
| 1,129,831 | Schaffert | Feb. 22, 1915 |
| 1,135,235 | Weiss | Apr. 13, 1915 |
| 1,285,800 | Roycroft | Nov. 26, 1918 |
| 1,754,448 | Waaler | Apr. 15, 1930 |
| 2,125,476 | Westrope et al. | Aug. 12, 1938 |
| 2,170,013 | Detwiler | Aug. 22, 1939 |
| 2,177,575 | Maxwell et al. | Oct. 24, 1939 |
| 2,199,981 | Bell | May 7, 1940 |
| 2,292,797 | Roberts | Aug. 11, 1942 |
| 2,480,304 | Pelton | Aug. 30, 1949 |